United States Patent [19]

Lewis et al.

[11] Patent Number: 4,615,028
[45] Date of Patent: Sep. 30, 1986

[54] SWITCHING SYSTEM WITH SEPARATE SUPERVISORY LINKS

[75] Inventors: Conrad Lewis, Nepean; Gino Totti, Kanata, both of Canada

[73] Assignee: Mitel Corporation, Ontario, Canada

[21] Appl. No.: 577,500

[22] Filed: Feb. 6, 1984

[30] Foreign Application Priority Data

Feb. 18, 1983 [CA] Canada ................................. 421936

[51] Int. Cl.⁴ .................................................. H04Q 11/04
[52] U.S. Cl. ...................................... 370/58; 370/110.1
[58] Field of Search ............................ 370/58, 110.1; 179/18 ES

[56] References Cited

U.S. PATENT DOCUMENTS

| | | | |
|---|---|---|---|
| 3,983,330 | 9/1976 | Tongi | 370/63 |
| 4,196,316 | 4/1980 | McEowen et al. | 179/18 ES |
| 4,281,410 | 7/1981 | Agricola et al. | 370/110.1 |
| 4,370,743 | 1/1983 | Moran | 370/60 |
| 4,488,290 | 12/1984 | Dunn et al. | 370/58 |
| 4,512,015 | 4/1985 | Kanó et al. | 370/110.1 |

Primary Examiner—Douglas W. Olms
Attorney, Agent, or Firm—Antonelli, Terry & Wands

[57] ABSTRACT

A digital switching system which is comprised of a circuit switching network under control of a main system control for carrying and switching transmission paths for signals transmitted between peripherals (i.e. lines, trunks, service circuits, etc.), and a separate message switching network under control of the main system control for carrying supervisory and control signals related to the status of the peripherals between peripheral unit management circuit controller(s) and the main system control.

21 Claims, 8 Drawing Figures

SWITCHING SYSTEM WITH SEPARATE SUPERVISORY LINKS

This invention relates to digital switching systems and particuarly to a system for switching and routing digitized voice, data, control and signalling signals.

While switching systems have in the past been used to control the switching or routing of analog voice signals, or of computer data signals, in recent years, the proliferation of data terminals in the office such as electronic mail display terminals, computer terminals, etc. as well as sophisticated telephone sets incorporating message displays, alphanumeric data generating keyboards, etc. has required the introduction of switching systems which switch and route signals from a mixture of all such terminals and telephone sets, and also accommodate increasingly high data rates. Such systems usually utilize peripheral modules which digitize the voice signals into pulse code modulated signals (PCM) and produce standard protocol digital signals for the voice and data signals, which are then switched through the system. In some cases digitized voice signals are segregated and are switched through a different switching module than the other data signals, due to different data speeds and protocols which may be involved. Some systems utilize switching stages which separate time and space division switching, which clearly presents complex control problems. Supervisory and control links are typically provided by the same transmission paths and channels which carry the digitized voice signals and/or data signals, and are switched by the same switching modules or matrices. Yet the traffic involved in voice and computer data communication signals is considerably different from the traffic involved in switching supervisory, control and other like signals.

The invention of a combination time and space division switching matrix, and particularly of one which facilitates the injection and reception of data signals into and from any channel to be switched by the matrix facilitates the provision of the switching system in which the traffic switching efficiency can be maximized. The present invention is directed to this facility.

Combination time and space division switching matrices are described in U.S. Pat. No. 4,093,827 issued June 6th, 1978 and assigned to Thompson-CSF, Paris, France, and in Canadian patent application No. 385,726 filed Sept. 11th, 1981, invented by Conrad Lewis, and assigned to Mitel Corporation.

Data switching systems of the type which is the subject of the present invention typically utilize a main or central control, a signal switching network controlled by the main control for switching signals from and to peripherals, one or a plurality of peripheral controllers, and peripheral interfaces which usually include analog/digital coder-decoders (CODECs), etc. Typically such systems digitize the supervisory and control signals, insert the channel supervision and control signals into the communication channels, extract them from the communication channels at another point, and pass them to the main control which controls the communication paths, setting up or taking down the paths, again via control signals sent on the communication paths.

In the present invention, the main communication paths between the peripherals are switched via a so-called circuit switch which switches PCM voice signals, high speed data signals, bulk data signals, etc. via serial paths between peripherals and controllers, etc. Supervisory and control signals, however, are switched via a so-called message switch, which controls data flow between controllers, low speed data between peripherals, or between controllers and peripherals. In the preferred embodiment, the paths between the peripherals and circuit switch, and between the peripherals and message switch are 2.048 megahertz, 32 channel serial links. The message switch and circuit switch communicate with a main system controller via high speed parallel buses.

The structure forms a network which provides maximum traffic with zero blocking in the circuit and message switches, the use of the main controller in a highly efficient manner, and distributed processing for repetitive tasks which otherwise would utilize valuable main processor time.

In general, the invention is a switching system comprising at least one peripheral control unit for connection to a plurality of peripheral units which are adapted to originate and/or receive digital signals, a main system controller, a circuit switching unit connected to the peripheral control unit for establishing transmission paths for the digital signals between peripheral units under control of the main controller, the peripheral control unit including a peripheral controller for monitoring the status of the peripheral units and for controlling the connection of the peripheral units to transmission paths leading to the circuit switching unit, and a message switching unit connected to the peripheral control controller for establishing transmission paths for carrying call progress, control and/or message signals between the peripheral controller and the main controller, whereby a call between the peripheral units is facilitated.

It is assumed that a person skilled in the art by whom this description would be understood is one who understands digital telephone and switching concepts, programming of microprocessors, the structure and operation of peripheral units such as analog trunks, analog line circuits, digital trunks, tone generators and receivers, recorded announcement circuits, etc., which interface via peripheral circuits to digital transmission paths. It is intended that the terms "message switch", "circuit switch" and "peripheral switch" refer to apparatus which switch a plurality of lines carrying time divided digital signal channels to others of the same or other types. The term "peripheral" means a peripheral unit or a buffer or interface to a peripheral circuit, line or trunk. The term "message" means control, supervisory or instruction signal.

A better understanding of the invention will be obtained by reference to the detailed description below of the preferred embodiment, with reference to the following drawings, in which.

Figure 1:
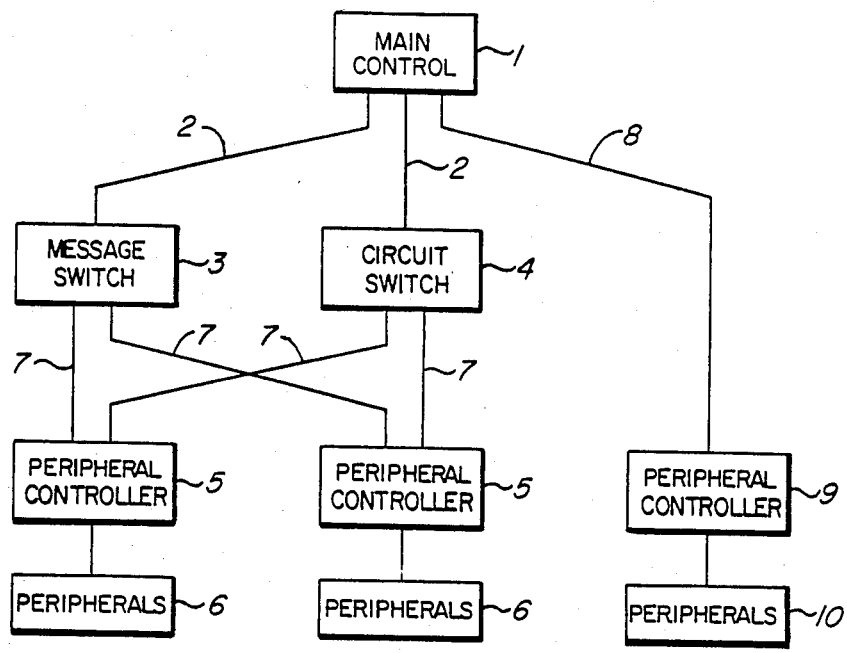
FIG. 1 is a basic block diagram of the system of the invention.
Figure 2B:
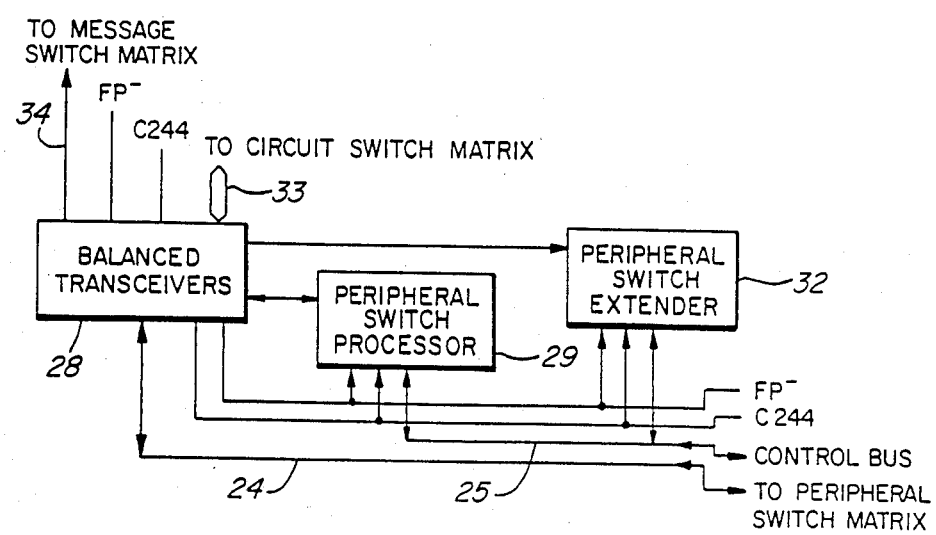
FIG. 2A is a more detailed block diagram of the system of the invention.
Figure 2A:
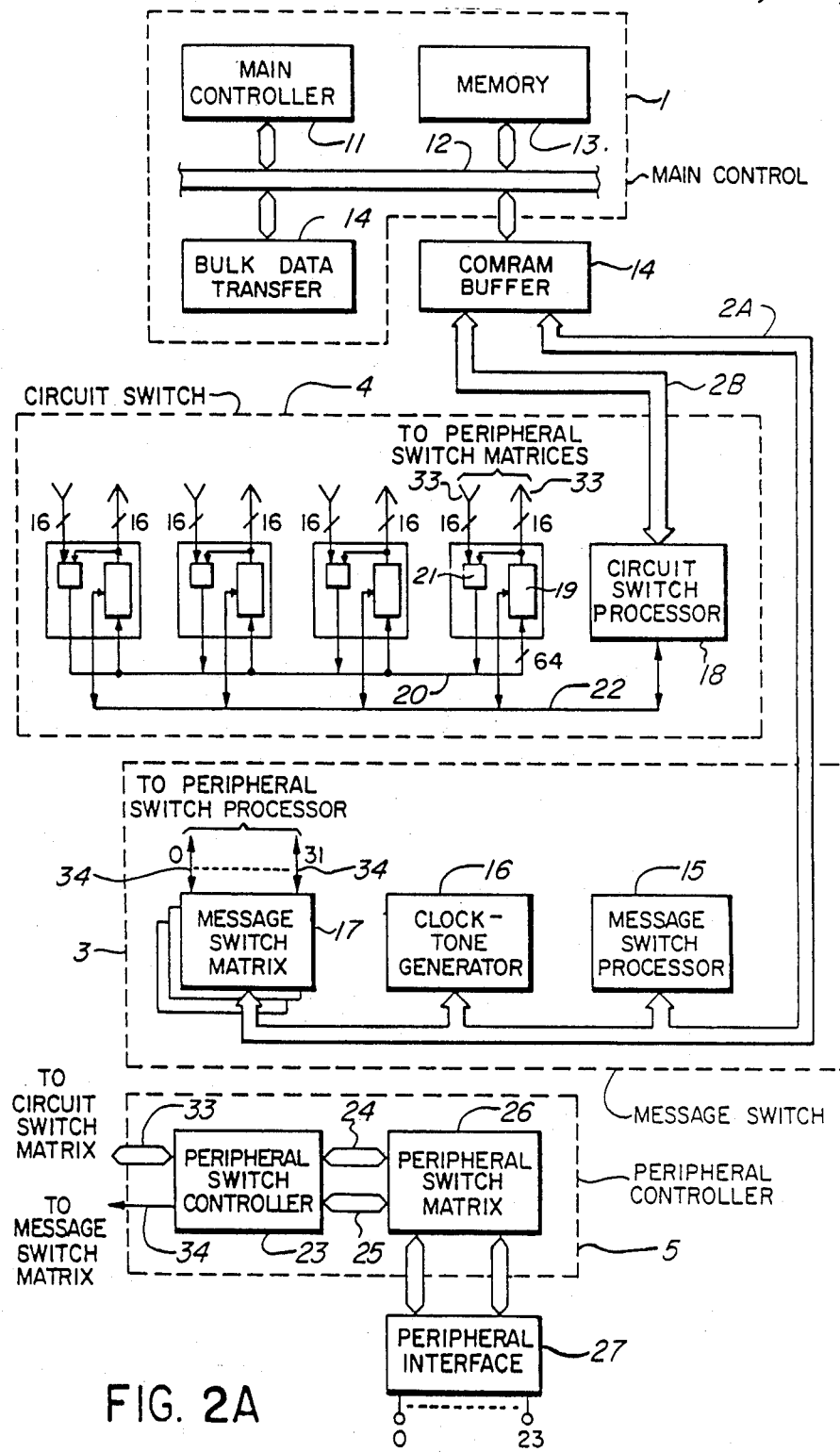
Figure 2C:
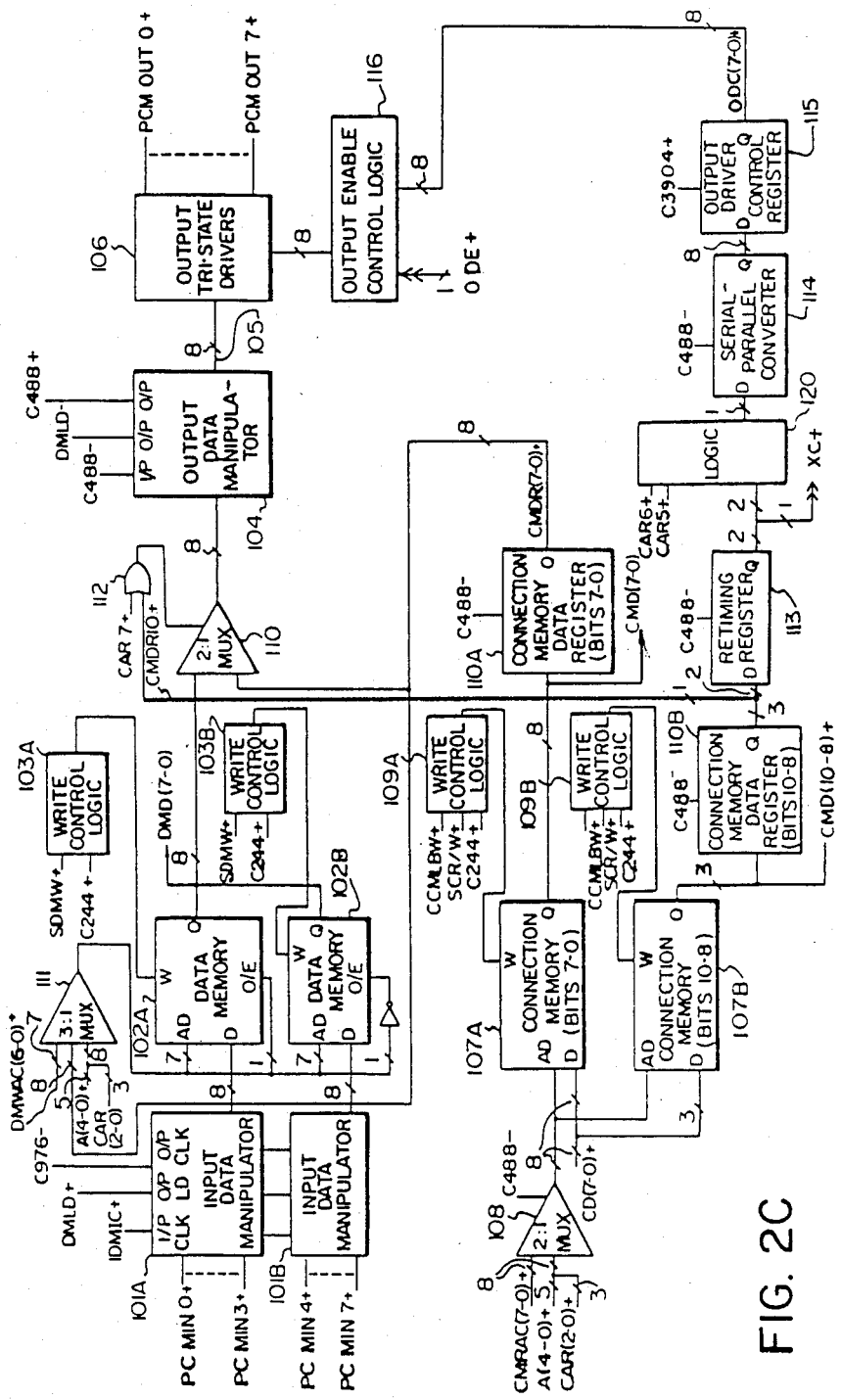
Figure 2D:
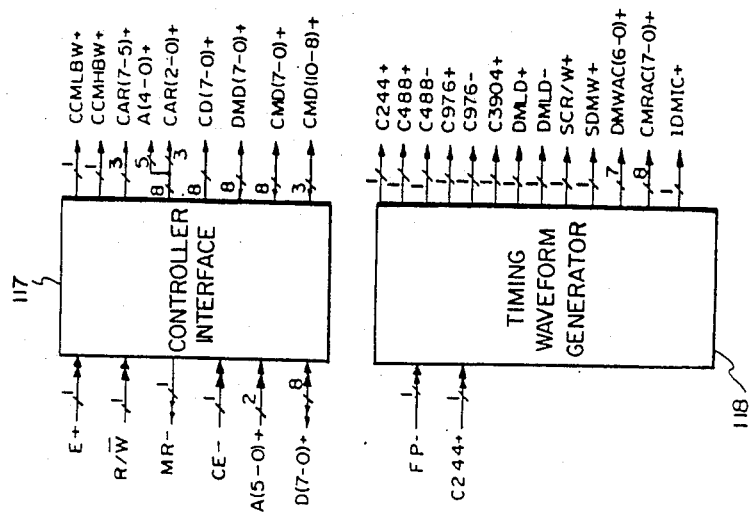
Figure 3:
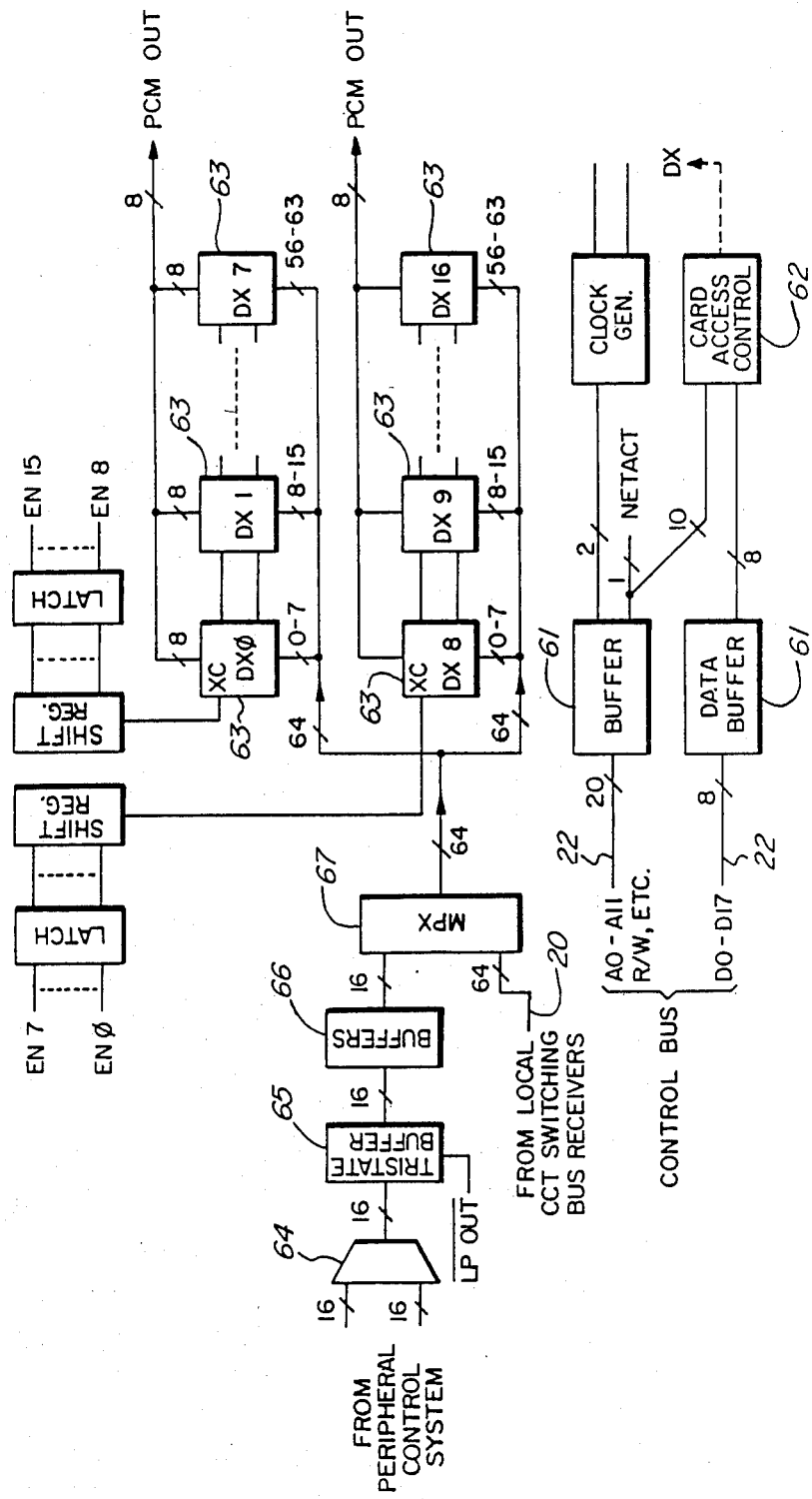
Figure 4:
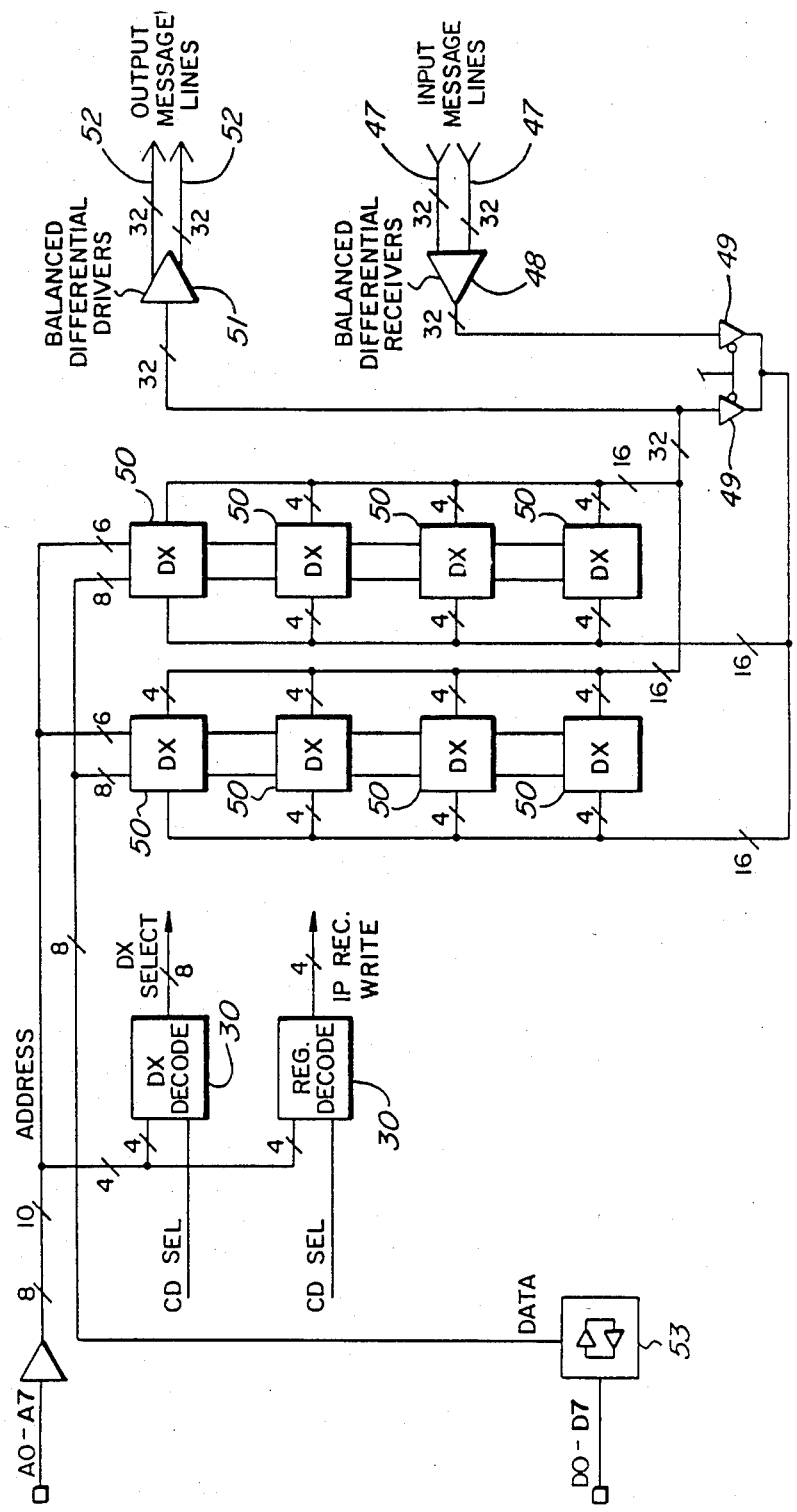
Figure 5:
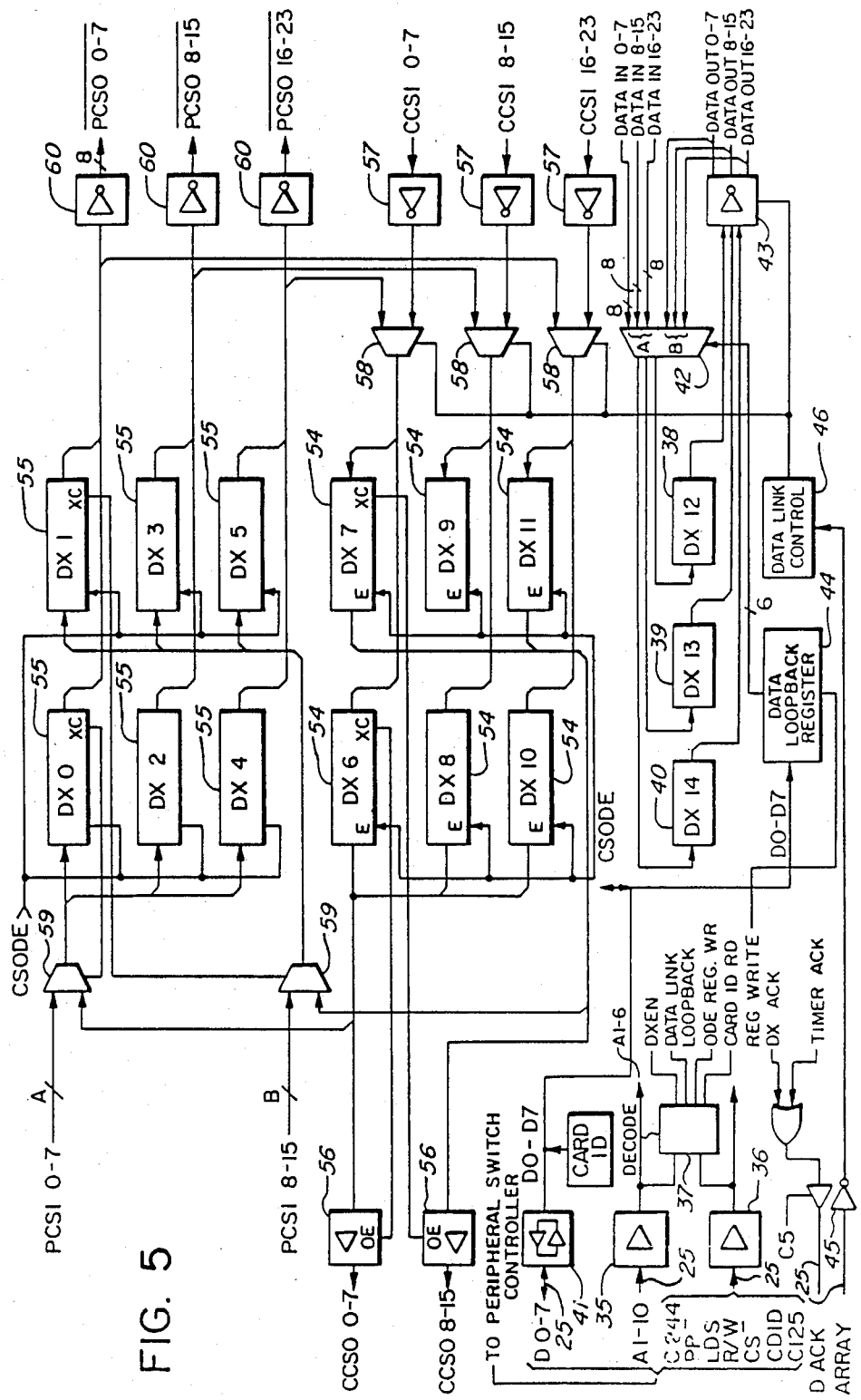

FIG. 2B, which appears on the same drawing sheet as FIG. 1, is a block diagram of the peripheral switch controller of FIG. 2A shown in more detail;

FIGS. 2C and 2D are block diagrams of the basic switching element used in the invention;

FIG. 3 is a block diagram of the circuit switch matrix portion of the invention;

FIG. 4 is a block diagram of the message switching matrix portion of the invention; and FIG. 5 is block diagram of the peripheral switch matrix portion of the invention.

FIG. 1 shows a block diagram of the basic system of the invention according to the preferred embodiment. The basic system consists of a main control 1, which controls the operation of the entire system, i.e. keeping track of established message paths, setting up new paths, and receiving and sending supervisory and control messages related to the progress of each requested and established call.

The main control is connected via one or more high speed 16 bit parallel data buses 2 to a message switch network or controlled matrix (message switch) 3 and a circuit switch network or controlled matrix (circuit switch) 4.

The circuit switch 4 is connected to one or a plurality of peripheral controllers 5 via serial data lines or links 7. The peripheral controllers connect to peripheral interfaces 6 to which peripheral units are to be connected.

The message switch 3 is also connected to peripheral controllers 5 via serial data lines or links 7.

The links 7 between the peripheral controllers and message switch 3 and circuit switch 4 are preferably serial links, e.g. 32 channel, operating at 2.048 megahertz per second.

The peripherals connected to peripheral interfaces 6 are for example, digital tone generators, digital conference circuits, digital recorded announcement circuits, digital trunks, analog telephones, analog trunks, tone receivers, digital telephone sets, paging circuits, nightbells, alarms, computer type work stations such as electronic mail terminals, personal computers, computer terminals, teletext terminals, etc. It has been found convenient to group analog peripheral interfaces together for connection to one peripheral controller and the digital circuits should be grouped together for connection to another peripheral controller. This facilitates more logical interconnection to similar types of circuits. The analog interfaces contain CODECs (coder-decoders) for connection of analog circuits to the system.

The system operates as follows, taking as an example the setting up of a call to a trunk. The peripheral controller continuously scans the peripheral interface circuits for service requirements (i.e. the presence of supervisory signals presented to it by a peripheral interface). In the case of a request for a connection of a telephone call between a telephone peripheral unit and a trunk, for example, the presence of a off-hook condition produces a supervisory request for service signal in a well known manner to the peripheral controller 5. The peripheral controller in response sends a message signal via link 7, message switch 3, and bus 2 to the main control 1. The main control retains a memory map of possible connections (circuits) from the peripheral telephone to a dialling digit tone receiver which is also connected as a peripheral circuit to peripheral controller 5. Preferably the digit receiver is one which is connected to the same peripheral controller as is the telephone. The main control 1 selects an idle digit receiver, then sends a message through message switch 3 to peripheral controller 5 to set up a circuit within the peripheral control unit network between the telephone and the tone receiver peripherals. The peripheral controller 5 proceeds to set up the link.

The user of the telephone then proceeds to dial (for example generating MF tones) which designate the request for an outside line (i.e. an central office trunk in the PABX case). The dialed digit tone receiver, receiving this request (e.g. receiving tones designating the digit "9") then applies a supervisory signal to the peripheral controller (which has been continuously scanning it and all other peripherals), to send a message via message switch 3 to main control 1 designating a request to connect the local telephone set peripheral to a central office trunk peripheral.

The main control 1 retains a memory map of idle and busy central office trunks and which channels are free to the telephone peripheral to the central office trunk peripheral. It then sends control messages via message switch 3 to the peripheral controller 5 to which both the telephone peripheral and central office trunk peripheral are connected, or to two peripheral controllers to which the telephone peripheral and central office trunk peripheral are separately connected, and also sends a further message to circuit switch 4. The message to the peripheral controller or controllers is an instruction to set up a connection between the peripherals and designated serial links leading to the circuit switch 4. The message to circuit switch 4 is an instruction to interconnect the two designated links leading to the peripherals.

With the telephone now connected to the central office trunk, the subscriber dials further digits which are sensed in the usual way by the central office.

The peripheral controller continues to scan the peripheral interfaces for conclusion of the call, and the connection to the links are severed when an on-hook condition is sensed. In a similar manner as described earlier, supervisory messages are sent to the main control 1 via the message switch 3, and the trunk and telephone peripherals are disconnected under control of an instruction message sent by the main control to the circuit switch 4.

Thus, the message paths are separate from the pheripheral communications circuit paths. Other kinds of calls between peripherals are handled in an analogous manner.

The links between the peripherals and the message switch and circuit switch are relatively low speed data links (i.e. 2.048 Mhz). However high speed peripherals such as disc drives can also be connected to the main control. For this case, the high speed parallel (e.g. 16 bit) bus 8 interconnects the main control with the high speed data peripheral controller 9. The disk drive or other high speed peripheral and its interface 10 is connected to the peripheral controller 9.

FIG. 2A illustrates the invention in more detail. The main control 1 is comprised of a main controller 11, comprised of a microcomputer, which is connected in a well known manner to a main control bus 12. A mass data storage memory 13 is also connected to bus 12, as well as a bulk data transfer circuit 14. The operation of the main control is not the subject of this invention, and it is assumed that a person skilled in the art understands the operation of a microcomputer which can control the operation of a switching system.

The main controller in conjunction with memory 13 contains programs and data and controls the operation of the system and retains status memory maps of the elements of the system.

A communication buffer referred to below as a COMRAM buffer 14 is connected to bus 12 via a 16 bit parallel bus. Buffer 14 is actually formed of two independent two port bidirectional buffers, one for use by the message switch 3 and one for use by the circuit switch 4.

The COMRAM buffer 14 is connected via a parallel bus 2A to the message switch 3, and in particular to a message switch processor 15, a clock-tone generator 16 and a message switching matrix 17 within the message switch.

In the preferred embodiment message switching matrix has up to 32 bidirectional serial message links (0-31) which operate at 2,048 megahertz. Each link is connected to a processor of a peripheral controller 5.

COMRAM buffer 14 is also connected via a parallel bus to the circuit switch 4, in particular to the circuit switch processor 18 which forms part of the circuit switch.

The circuit switch 4 is also comprised of a circuit switch module having up to four sections which form a combination time and space division switching matrix. Each section of the module contains a 64 parallel line input by 16 line output switching matrix 19, having its 64 line input connected to a local bus 20, and its 16 output lines connected to peripheral switch transceivers. Sixteen input lines from the peripheral switch transceivers are connected in each section to a multiplexer 21, the output of which is connected to bus 20. The circuit switch processor is connected to a control bus 22, to which controllers of the matrix 19 are connected.

The circuit switch module thus can switch up to four multiples of sixteen bidirectional serial links which are connected to the peripheral controllers 5.

In particular the serial links are connected to transceivers within a peripheral switch controller 23 contained in each controller 5. The peripheral switch controller 23 also has dedicated serial links connected to the message switch matrix as described earlier. The peripheral switch controller 23 is also connected via a 16 bit internal circuit bus 24 and by a control bus 25 to a peripheral switch matrix 26. The peripheral switch matrix 26 is connected to peripheral switch interface circuits 27 which have ports 0-23 to which peripheral devices or circuits are connected.

Turning to FIG. 2B, the peripheral switch controller 23 is shown in more detail. The links 33 to the circuit switch modules are connected to balanced transceivers 28. Also connected to balanced transceivers 28 are the links 34 to the message switch matrix 17, a line on which the frame pulse FP—is received and the clock C244 line. The latter two lines are also extended to other components of the peripheral controller. The balanced transceivers 28 are connected to a peripheral switch processor 29, which is also connected to control bus 25. The balanced transceivers 28 are connected to bus 24 leading to the peripheral switch matrix. A peripheral switch extender 32 is connected to the balanced transceivers and to the control bus as well as to the frame pulse and clock lines.

Before proceeding further, it will be helpful to briefly describe the basic time and space division switch used in this invention, referred to herein as a DX switch. The switch is fully described in the aforenoted Conrad Lewis patent application, to which the reader is referred. A block diagram of the DX switch is shown in FIGS. 2C and 2D.

Turning to FIG. 2C, a plurality of input lines carrying time division multiplexed input signals, typically 8 lines in number referenced PCMIN0-PCMIN7 are connected to an input data manipulator, shown in two sections 101A and 101B. The data carried by each input line is received in serial format whereby the time sequence of data is divided into frames, each frame being divided into 32 channels, and each channel being divided by 8 bits comprising a data word. In the manipulators 101A and 101B, the input signals are converted from serial into parallel form. The resulting sequences of signals are applied via an 8 bit parallel link from each manipulator to the data D input of the two corresponding portions of a data memory 102A and 102B, referred to below as memory 102. The timing of the storage of this data in data memory 102A and 102B is controlled by write control logic circuits 103A and 103B which are controlled via a pair of leads SDMW and clock source C244, both carrying timing waveforms generated in a timing waveform generator 118 (FIG. 2D). The memory portions could of course be combined, as could the input data manipulator portions and write control logic circuits. The data memory for the example shown is organized as 256×8 bits for storing one frame from each of the 8 input lines, each of which carries a 2.048 MHz serial data stream.

The output port Q of data memory 102 is carried via an 8 bit parallel link through circuitry to be described later to an output data manipulator 104, which provides parallel to serial conversion. Manipulator 104 is operated by input and output clock signals and output lead timing signals on its I/P CLK, O/P CLK and O/P LD ports respectively.

8 bit parallel output leads 105 are connected to a corresponding number of tri-state switches or drivers 106, the outputs of which are connected to a group of 8 output leads PCMOUT 0-PCMOUT 7 each for carrying time division multiplexed output signals.

A 256×11 bit connection memory organized into an 8 bit portion 107A and a 3 bit portion 107B has its 8 bit parallel data input terminals D connected via line CD (7-0) to a controller interface 117 (FIG. 2D) for providing a source of data, which is connected to a microprocessor controller (not shown). The 8 bit parallel address inputs AD of the connection memory are connected to the output of a 2:1 multiplexer 108, which has two 8 bit parallel inputs. One of the inputs is divided into two groups, one for receiving addresses on 5 parallel lines A(4-0) and one for receiving addresses on 3 parallel lines CAR(2-0), for connection to a microprocessor controller via controller interface 117. The other 8 bit parallel input is connected to a timing waveform source via leads CMRAC(7-0). Write control logic circuits 109A and 109B have their outputs connected to the write leads W of the respective connection memory portions 107A and 107B, and have as inputs timing signals on leads CCMLBW, SCR/$\overline{W}$, and CLK244.

The 8 and 3 parallel output leads respectively from outputs Q of connection memory portions 107A and 107B are connected to the data inputs of a pair of corresponding connection memory data registers 110A and 110B. The output leads of connection memory portions 107A and 107B are also connected to the CMD(7-0) and CMD(10-8) inputs of controller interface 117 which is connected to a microprocessor controller.

The leads connected to the outputs Q of data memory portions 102A and 102B are connected to the DMD(7-0) inputs of the controller interface 117 which is connected to the microprocessor controller.

An 8 bit output of the connection memory data register 110A is applied to corresponding 8 bit parallel inputs of multiplexers 110 and 111. The second 8 bit input of multiplexer 110 is connected to the output of the data memory (referred to below as 102), and the 8 bit parallel output of multiplexer 110 is connected to the input of serial to parallel converter output data manipulator 104. Seven of the 8 parallel output bits of multiplexer 111 are applied to the address AD input of data memory 102, while the eighth bit is applied to its output enable input through an inverter 119. An 8 bit parallel second input of multiplexer 111 is connected to the address A(4-0) output and the memory address output CAR(2-0) of controller interface 117. In addition, a third 7 bit parallel input is connected to timing waveform generator 118 via leads DMWAC(6-0).

Output bits 8-10 of the connection memory data register 110B are applied to a three bit parallel input CMDR10 of OR gate 112. A second input of OR gate 112 is connected to a CAR7 lead from the controller interface 117. The output of OR gate 112 is connected to the input selection port of multiplexer 110, whereby either of the two inputs to the multiplexer can be selected.

The output leads from the connection memory data register portion 110B carrying bits 8 and 9 are connected to the input of a retiming register 113. The bits are passed through to logic circuit 120, and a single bit output lead is connected to the input of serial to parallel converter 114. The bit 9 output lead of retiming register 113, referenced XC, is made available for control of an external circuit. Leads CAR6 and CAR5 from the controller interface 117 are connected to logic circuit 120.

Serial bits of the output lead from the connection memory data register 110 are converted to parallel format in serial to parallel converter 114, and are applied in 8 bit parallel form from the output Q of converter 114 to an output driver control register 115. The output leads CDC(7-0) from register 115, which carry output driver control signals, are connected to corresponding inputs of an output enable control logic circuit 116, with an output driver enable input lead ODE, which can be connected from external circuitry for forcing the output tri-state driver to a particular state from an external circuit. The output leads of output enable control logic 116 are connected to the control inputs of the output tri-state drivers 106.

A microprocessor controller interface circuit 117 (FIG. 2D) interfaces the above described circuit with a microprocessor controller (not shown) via leads E, R/W, MR, CE, address bus leads A(5-0) and data bus leads D(7-0). The inputs to the controller interface 117 are the 8 data memory read data leads DMD(7-0), and the 11 connection memory read data leads CMD(7-0) and CMD(10-8). The outputs from controller interface 117 are the single individual controller connection memory low and high write enable leads CCMLBW and CCMHBW, 5 address bit leads A(4-0) controller address register bits CAR(2-0), controller address register bits (7-5) for specifying data and connection memory addresses, and 8 leads specifying connection memory input data CD(7-0).

In operation, input signals are received on leads PCMIN0-PCMIN7 and are converted from serial to parallel in the serial to parallel converter of input data manipulator, portions 101A and 101B. The parallel data is then written into a speech memory corresponding to data memory 102. An address memory, constituted by connection memory 107, stores addresses of data words to be read out to a parallel to serial converter corresponding to data manipulator 104, from where it is applied directly to the output lines PCMOUT0-PCMOUT7.

Thus the circuit performs the combination of time division switching and space division switching as noted above.

A microprocessor controller has both read access to the data memory 102 and read and write access to the connection memory 107. Consequently while the data memory 102 stores one frame of 8 bit words received on the 8 serial input links, any of this data can be read by the microprocessor controller. This is effected by the output of data memory 102 being connected via output leads DMD(7-0) from memory 102 to the input of controller interface 117. Thus data signals transmitted on the input PCM lines can be read by the microprocessor controller.

The microprocessor controller writes into the connection memory 107 via data leads CD(7-0) at addresses specified on leads A(4-0) and CAR(2-0) which are connected to multiplexer 108, and reads the contents of the connection memory via leads CMD(7-0) which are connected from the output of connector memory 107A to corresponding inputs of controller interface 117.

The microprocessor can also write directly to the output leads PCMOUT0-PCMOUT7 as follows. Signals from the connection memory are temporarily stored in the data register portions 110A and 110B. The most significant 8 bits output from the connection memory data register 110A ((CMDR(7-0)) are applied to one of the parallel input ports of multiplexer 110, while the output bits of data memory 102 are applied to the other input port. Since bit 10 from data register 110B with the bit on lead CAR7 from the microprocessor controller controls which of the two groups of inputs of multiplexer 110 are output therefrom to output data manipulator 104 and to the PCM output leads, it is clear that the microprocessor controller can substitute its own signals on the output leads instead of the PCM words from data memory 102.

As noted earlier, when such signals are stored in data memory 102 from a preceding similar switching matrix, either voice signals or data signals, these signals can be read via leads DMD(7-0) from the output of data memory 102 directly to the local microprocessor through the controller interface 117. Controller to controller communication is thus facilitated.

The signals stored in data memory 102 are normally designated to output PCM links and time slots by addresses specified by signals stored in the connection memory 107A, and which are input to multiplexer 111 via connection memory data register 110A and 8 bit parallel leads CMDR(7-0). In addition, the microprocessor can direct specific substitute words to be output from data memory 102 through memory address leads CAR(2-0) and A(4-0) which are input to multiplexer 111. A third source of signals to multiplexer 111 is timing signal lead DMWAC(6-0) which is connected from a timing waveform generator 118 (FIG. 2D).

The microprocessor writes 11 bit words (bits 0-10) into connection memory portions 107A and 107B at addresses specified on leads CAR(2-0) and A(4-0), at times specified by the write control logic circuits 109A and 109B, which issues write commands to the associated memory. Bit 10 of the connection memory is used to select either the data memory or bits 7-0 of the connection memory as the source of 8 bit words to be sent out on the serial output links. Depending on the state of bit 10, bits 7-0 either form the word to be transmitted via leads CMDR(7-0) and multiplexer 110 to the output data manipulator, or select one of the 256 8 bit words stored in the data memory to be transmitted on the corresponding output links during the corresponding channel time. As described earlier, bit 10 is passed through OR gate 112, which alters the state of multiplexer 110, defining the particular source of data which is enabled to pass therethrough to output data manipulator 104.

Bit 9 of the connection memory is used to control an external circuit. This bit is received from connection memory data register portion 110B, is corrected for phase in retiming register 113 with clock timing signal C488 and is made available on lead XC for control of external circuit.

Bit 8 passes from connection memory data register portion 110B through retiming register 113, through logic circuit 120 to serial to parallel converter 114, sequential bits being converted by serial to parallel converter 114 into 8 bit parallel form, which is stored in output driver control register 115. The output signal is applied to output enable control logic 116, from which it is applied to the gates of output tri-state drivers 106. The transmission and output impedance states of the tri-state drivers for corresponding output links are thereby specified.

When bit 10 is 0, bits 7-0 of the connection memory specify which one of the data memory words is to be sent out on the serial output link which corresponds to the connection memory location, during the channel time which corresponds to the connection memory location. Thus when bit 10 is 0, bits 7-0 are an address signal, which is applied from lead CMDR(7-0) through multiplexer 111 to the AD input of data memory 102.

When bit 10 is 1, bits 7-0 of the connection memory constitute the data word which is to be sent out on the serial output link which corresponds to the connection memory location, during the channel time which corresponds to the connection memory location. This word is passed through multiplexer 110 as described earlier.

The microprocessor controller thereby reads the serial input links from the data memory without concerning itself about frame, channel, and bit timing and serial to parallel conversion. By writing the connection memory, the microprocessor controller can transmit data words via the serial output links without concerning itself about timing and parallel-serial conversion.

It is thus clear that the DX switch can switch signals between incoming and outgoing channels on any of the incoming and outgoing lines, and can also transmit data to a microprocessor or receive data from a microprocessor and apply the data into any of the outgoing channels. The microprocessor, further, can control the switching paths within the DX switch. The DX switch can also control or send data to another device via the XC lead. The DX switch has been integrated into a single chip. The present invention is facilitated by the ability to transmit data via, and use the DX switch in various ways.

Operation of the present invention in conjunction with the DX switch will be described below with reference to the detailed block diagrams of FIGS. 3, 4 and 5. The description will be facilitated by following the processing of a call. It is of course clear that message formats and message constituents can be changed to fit the particular design and portion of the call sequence being implemented. In one successful embodiment, the message format was comprised of a 32, 16 bit bytes, with at least a portion of the first byte being a designator for the type of message which is to follow (e.g. off-hook, on-hook, etc.).

Turning now to FIG. 5, it is assumed that a peripheral interface circuit to which the circuit of FIG. 5 connects contains both PCM information signal paths and paths to peripheral interface controllers or controllers of the peripheral unit itself. Thus dedicated bi-directional data links DATA IN 0-7, DATA IN 8-15, DATA IN 16-23, DATA OUT 8-15 and DATA OUT 15-23 connected to the controllers of the peripheral interface circuits, and dedicated bidirectional signal transmission links PCS 0-7, PCS 8-15, PCS 16-23, CCS 0-7, CCS 8-15 and CCS 16-23 connect to the PCM information transmission ports of the peripheral interface circuits. The peripheral switch matrix to be described below performs traffic concentration from 48 bidirectional PCM links of 32 channels from the peripheral side into 8 or 16 bidirectional links of 32 channels which lead to the circuit switch.

The peripheral switch processor 29 (FIG. 2B) communicates via control bus 25 which is shown in FIG. 5 as constituting data leads D0-7, address leads A1-10 as well as leads C244, FP-LBS, R/W, CS-, CDID and C125 (being clock, frame pulse, load, read/write, chip select, and clock leads), as well as a data acknowledge (DACK) and array enable leads. The peripheral switch processor contains program signals to continuously scan the peripheral interface cards. The scanning function is of course well known. However in the present case the use of a group of DX switches of the type described with reference to FIGS. 2C and 2D in the manner described herein is believed to be novel.

The peripheral switch processor outputs control signals on the aforenoted control bus which are passed through buffers 35 and 36, decoded in decoder 37 and emerge on a bus labelled DXEN (DX switch enable), DATA LINK LOOP BACK (not used for this embodiment), ODE REG WR and card ID RD (card identification read). The DX enable, and other leads from the peripheral switch processor interface the controller interface and timing waveform generator of each of three 8×8 DX switches 38, 39 and 40. Similarly the data lines D0-D7 are connected through a bidirectional buffer 41, its D0-D7 output leads being connected to the controller interface of the three DX switches. The data input leads of the peripheral interface, DATA IN 0-7, DATA IN 8-15 and DATA IN 16-23, are connected to one phase input of multiplexer 42, which has its three outputs connected to the PCM IN 0-7 input leads respectively of the DX switches 38–40. The PCM OUT 0-7 leads of the three DX switches are connected to three inputs of a buffer 43 which has its three outputs connected to the data output leads DATA OUT 0-7, DATA OUT 8-15 and DATA OUT 16-23 to the controller of peripheral interfaces. Accordingly a bidirectional transmission link is set up between the peripheral switch processor 29 (FIG. 2B) and the data output and data input leads to the peripheral interface circuits via the three DX switches 38, 39 and 40.

In operation the peripheral switch processor outputs a signal which is passed into the connection memory and then into the data memory of the three DX switches which cause scanning of signals on the data input leads from the peripheral circuits. Assuming for example that a peripheral telephone has gone off-hook, a predetermined format signal is received via one of the data input leads DATA IN 0-23, multiplexer 42, one of the PCM IN 0-7 leads, and is stored in the data memory of a corresponding DX switch which is active during the interval corresponding to the scanned lead and input channel. The data memory contents of the DX switch are received by the peripheral switch processor 29 via the data memory output DMD lead (FIG. 2C), which data passes via buffer 41 (FIG. 5) to the control bus 25 (FIG. 2B).

In the above manner the peripheral switch processor continuously scans the peripheral units for changes of state (or messages from intelligent peripherals) designated for the main control. The peripheral switch processor 29 also utilizes controller interface to the DX switches 38-40 in a similar manner to transmit scan control message signals out on the PCM DATA OUT 0-23 links of these DX switches. Since the links are dedicated for each peripheral, the particular scan signal format and peripheral state message signal format can be set to suit the design. In the aforenoted prototype, the message signal was formed in which a message type formed part of the first byte, a control byte formed the last byte which had portions designating the protocol and included protocol control bits, and the remaining bytes contained the message such as the addresses of the sender and receiver, a function code, data bytes, a checksum, etc. The message typically 18 bytes in length contained one or more function codes designating a numerical representation of a function to be performed, and a number of data bytes that this function could use as parameters. The number of bytes to follow the function code was indicated by the code itself, i.e. one code may indicate that three bytes of data may follow while another code may not require any data at all.

Assuming that the peripheral switch processor 29 has detected the signal stored in the data memory of one of the DX switches 38-40 which indicates that a particular peripheral has gone off hook, it formats the message and stores it in a software buffer for transmission via a balanced transceiver 28 and the message switch matrix to the main control.

It will be noted that the data output leads DATA OUT 0-23 of buffer 43 are connected to the second phase input ports of multiplexer 42. Multiplexer 42 puts through either phase A or phase B inputs, and is actuated via a signal received from a data loop back register 44, which receives data signals via buffer 41 resulting from the peripheral switch processor signal. When a predetermined signal is received by the data loop back register 44, it causes multiplexer 42 to connect the output leads of the buffer 43 through to its output leads in phase of the DATA IN 0-23 leads, thereby providing a facility whereby a signal received either from the peripheral switch processor 29 or from the peripheral interface circuit via the DATA IN 0-23 leads may be stored in the data memory of the DX switches 38-40.

A signal from the peripheral switch processor 29 is also applied via an inverter 45 to a data link control circuit 46 which output, connected to buffer 43, controls the state of each of the links passing through buffer 43.

The message switch 3 (FIG. 2A) continuously scan each peripheral switch processor to determine whether a message signal is stored in its output buffer. The message switch processor 15 sends a predetermined cyclic scanning message to the message switch matrix 17 via lead A0-A7, D0-D7, etc. (FIG. 4). This scanning message (i.e. designating "do you have a message"?) is applied to the connection memory 107A of DX switches 50 (see FIGS. 4 and 2C) through multiplexer 110 so that the PCM output links are connected through the balanced differential drivers 51 (FIG. 4) to the output message links 52 leading to the peripheral switch transceivers, and polls each peripheral switch processor for a response message indicating that its output buffer contains a message. In response, the polled peripheral switch processor sends the message, clearing its buffer.

The message signal from the peripheral switch processor 29 having passed through transceiver 28 appears on one of the input message links 47 to balanced differential receivers 48. The signal passes through a tri-state buffer 49 and is applied via one of the input leads PCM 0-PCM 7 (FIG. 2C) to the data memory of one of the DX switches 50 of an array of 8. However this occurs after the peripheral switch processor has been scanned.

The response message signal is thus passed via the dedicated serial input message links 47, through balanced differential receivers 48, through tristate buffer 49 and into the PCM input link of one of the DX switches 50, (the DX switch selected depending on the input link and channel via decoders 30).

The message switch processor accesses the data stored in the DX switch data memory via its DMD lead (FIG. 2C) and the controller interface, shown substantially in FIG. 4 as buffer 53. The data is applied to parallel bus 2A (FIG. 2A) and is received by COMRAM BUFFER 14 for application to the main control.

The main controller 11 of main control 1 continuously scans the COMRAM BUFFER 14, which is a first in—first out buffer, and reads data contained therein.

The main controller maintains an updated map of the status of each peripheral in a well known manner. It also stores in its mass storage a plurality of program signals which format messages to control the system. This function is also well known. However, in the prior art system described earlier, these control messages are inserted into the message switching paths and utilize bandwidth which, in the present invention, can be used for data or PCM voice signals which are to be transmitted between peripherals. The bandwidth available for such transmission is substantially increased in the present invention since messages are transmitted via a separate message switching network having a traffic capability designed to match the transmission and switching requirements of the supervisory signals. The facility is obtained easily by the use of the DX switches described herein.

Returning to the description of operation, the main controller, having received a message signal via the system described above that a particular peripheral has gone off hook, formulates a message signal to be returned to the peripheral acknowledging that it has received the message. This signal is downloaded via parallel bus 12 into COMRAM BUFFER 14, which operates in the reverse direction in the same way as described earlier. The signal is accessed by the message switch processor 15 which loads it into the data memory of one of the DX switches 50 (FIGS. 2C, 2D and 4) via the controller interface 117, connection memory 107A and multiplexer 111. The signal is then passed via one of the PCM output links PCM OUT 0-7 and message links 52 (FIG. 4, or 34, FIGS. 2A and 2B) to the peripheral controller 5. In particular, the signal is received on a message switch link 34, passing through balanced transceivers 28 (FIG. 2B) to the peripheral switch processor 29. The peripheral switch processor thus has received an indication that the main control acknowledges receipt of the message.

The type of intelligent peripheral unit should also be stored in the main control memory map. The peripheral may be a kind having computing intelligence and requires acknowledgement of receipt of the off-hook (or other) message. In that case, the message sent by the main control back to the peripheral switch processor would be to require the peripheral switch processor to apply the signal via control bus 25 (FIG. 5), buffers 35 and 36 and decoder 37 into the connection memory 107A (FIG. 2C), and then into the data memory 102 of one of the DX switches 38-40, in a memory location which corresponds to the output link to the intelligent peripheral. The message signal is then output from the data memory of the particular DX switch 38-40 on one of the PCM output links leading to the buffer 43 and the data output links DATA OUT 0-23 to the peripheral interface card and thus the peripheral which requires the acknowledgement.

Assuming that the main control 1 has ascertained that the peripheral is of an unintelligent type, for example an ordinary telephone, a sensed off-hook condition would require the connection of a tone or dial pulse receiver to receive dialling signals from the peripheral. The main controller then reviews its memory map of the signal circuit paths between the peripheral requesting service, and an idle peripheral tone receiver via the circuit switch 4. Assuming that the location of an idle path has been determined, the main controller sends a message signal to the peripheral controllers, and to the circuit switch processor 18 to set up the circuit path.

The message signal is received by the peripheral switch processor 29 via the message links as described earlier, and applies DX switch control signals to its control bus 25. In this case, however, the signals are meant for one or both of the two DX switch switching arrays consisting of DX switches 54, (FIG. 5) which handle signals received from the peripheral, or DX switches 55 which handle signals destined for the peripheral.

For the present example, the signals received by the peripheral switch processor caused it to set up a link between one of the PCM input lines CCSI 0-23 to one of the DX switches 54, to a specific output line CCSO 0-15. The output line is connected through one of the buffers 56 to one of the output lines CCSO 0-7 and CCSO 8-15. The input paths CCSI 0-7, CCSI 8-15 and CCSI 16-23, which are connected to the specific peripheral for receipt of PCM voice, dialling signals or the like are connected through input buffers 57, loopback multiplexers 58 (the latter is not used as such in this invention) to one of the input PCM lines of the DX switch 54 matrix.

Returning to FIG. 2A, the main control 1 also sends a signal via the COMRAM BUFFER 14 and associated parallel bus 2B to the circuit switch processor 18. In response, the circuit switch processor 18 (FIG. 2A) applies a signal to one or more of the DX switch matrices 19 and multiplexers 21 to set up a transmission path between an incoming link from a peripheral switch buffer 56 (FIG. 5), through multiplexer 21 (FIG. 2A) to the local bus 20 and out to a particular outgoing channel on a particular outgoing link via matrix 19. In this manner a link is set up between one of the channels of the leads CCSI 0-7 or CCSO 8-15 (FIG. 5), through the circuit switch matrix (FIG. 2A) to another link leading to a dialling signal receiver peripheral unit.

The link from the circuit switch to the dialling signal peripheral unit is set up in a similar manner as the link from the telephone peripheral to the circuit switch. A message signal is formulated in the main control and is sent via the message switch and message links to the peripheral controller to which the selected idle dialling signal receiver is connected. For sake of explanation, it will be assumed that this peripheral is connected to a peripheral interface card which is accessed on leads PCSO 0-7, PCSO 8-15 or PCSO 16-23 (FIG. 5). Accordingly the peripheral switch processor 29 (or an equivalent one in another peripheral controller) causes a PCM link to be set up through one of the DX switches 55. The PCM input ports of the switches are connected from input leads PCSI 0-7 and PCSI 8-15 through multiplexers 59 (not used as such in this specific invention). The output PCM links of DX switches 55 are connected through output buffers 60 to the output links PCSO 0-7, PCSO 8-15 and PCSO 16-23 which are connected to peripherals one of which is the dialling signal receiver.

Accordingly a signal path is set up between the peripheral telephone which has gone off hook, through the DX switch array 54, on one of the output links CCSO 0-7 or CCSO 8-15 to the circuit switch 4, where it is switched to an output link leading to one of the serial input leads PCSI 0-7, PCSI 8-15, through DX switch 55, via one of the output leads PCSO 0-7, PCSO 8-15, PCSO 16-23 to the dialling signal receiver.

Before describing the operation of the circuit switch matrix, it should be noted that two other intermediary steps would normally be taken, which have not been described in detail in order to make a description of this invention clear. During the peripheral matrix and circuit switch matrix set up stage, a message signal would be sent from the main control to the peripheral interface circuit of the peripheral to operate a muting circuit (i.e. to short circuit the telephone set leads during the time that the switches are setting up the transmission paths), in order to make the connecting interval silent. Once the transmission paths have been set up, of course, the muting is released. This can be done by timing, or by transmission of a mute release message from the main control.

The second intermediary function is the return of dial tone to the peripheral unit telephone. In the preferred form of the invention, a tone generator 16 (FIG. 2A) generates continuous tone signal. Appropriately interrupted bursts of this signal for the type of signal to be generated are encoded and sent under control of the message switch processor into the message switching matrix. The signal is transmitted as a PCM signal to the peripheral controller and is applied by the peripheral switch processor through the DX switches associated with the telephone peripheral. The PCM signal is translated by the peripheral interface circuit, is decoded in the CODEC of the interface, sent to the telephone set and is heard by the telephone set user as dial tone. Once dialling has begun (the presence of which is sensed by scanning by the peripheral controllers as described earlier), and the initial sense message signal has been sent to the main control, a message is sent by the main control to the message switch processor to cut off further dial tone from being sent to the telephone set peripheral.

Turning now to FIG. 3, one of the four circuit switch switching sections shown in FIG. 2A is illustrated. A signal is received from the main control by the circuit switch processor via bus 28, which is applied to the control bus 22. The signal passes through buffers 61 (FIG. 3A) and card access control 62, which are in controller 117, interface 62 from which it is applied to the connection memory of one of the DX switches 63 of an array 16. A particular input to output channel transmission path is thereby made between one of the input channels to one of the PCM output channels PCM OUT.

Input signals from the peripheral controller transceivers received via multiplexer 64, are passed through tristate buffers 65 and 66 and via one phase input through multiplexer 67 to the PCM input leads of the DX switch 63 array. The 64 lead local switching bus 20 is also connected to the search phase input of multiplexer 67, whereby signals from other switching matrices within the circuit switch shall be applied as input to this DX switch array.

The links through the circuit switch should be bidirectional, and thus two links per circuit should be set up by the main control. Of course for certain call requirements the main control need only set up a unidirectional link.

The system described above thus transmits supervisory signals via a message link system between peripherals and the main control, and sets up separate circuit links for carrying the normal circuit signals related to the call between peripherals, and is facilitated by the use of the DX switches. A switching matrix formed of DX switches for time and space division switching of PCM signal transmission paths is used to transmit message signals between controllers via the switched message links, and control messages via the switched message links from the controllers. The controllers access data messages from the message links and apply them to the PCM links. The system sets up, using similar DX switches, separate circuits for the transmission of normal circuit signals between peripherals. The peripherals can of course be the analog circuits which transmit PCM encoded messages via a CODEC, intelligent terminals or terminals under complete control of the main control, or service circuits such as dial signal receivers, line circuits, trunk circuits, conference circuits, recorded announcement circuits, etc.

A person understanding this invention may now conceive of other embodiments or variations in design using the principles disclosed herein. All are considered to be within the sphere and scope of this invention as defined in the claims appended hereto.

We claim:
1. A switching system comprising:
    (a) a main system control means,
    (b) a plurality of peripheral units, including peripheral unit control circuit means associated therewith and ports for connection of peripherals thereto,
    (c) a circuit switching network under control of the main control system connected via links to said peripheral units for carrying and switching transmission paths for signals transmitted between the peripheral units via said ports, and
    (d) a message switching network separate from the circuit switching network connected between the peripheral unit control circuit means and the main system control for carrying and switching supervisory and control signals related to the status of the peripherals between said peripheral unit control circuit means and the main system control means.

2. A system as defined in claim 1 in which the message switching network is comprised of a message switch control processor connected to the main system control means for communication therewith, and a message switching matrix, the matrix having input and output ports for carrying said supervisory and control signals to and from said matrix and a control port connected to the message switch control processor for carrying said supervisory and control signals between the main system control means and said matrix as well as control signals for controlling said matrix.

3. A system as defined in claim 2, in which said supervisory and control signals are digital in form, said message switching matrix being comprised of a matrix of combination time division and space division switching circuits adapted to switch predetermined supervisory signals from said input ports to said control port and predetermined supervisory and control signals from said control port to said output ports.

4. A system as defined in claim 3, in which the circuit switching network is comprised of a circuit switching network control processor connected to said main system control means, a plurality of bidirectional ports for carrying signals between peripheral units, and a circuit switching matrix for switching said latter signals between said ports under control of said control processor.

5. A system as defined in claim 4, in which the signals carried between peripheral units are digital in form, and said circuit switching matrix is comprised of an array of combination time division and space division switching circuits.

6. A system as defined in claim 2, 4 or 5 in which said peripheral unit control circuit means is comprised of a first switching matrix connected to the input and output ports of the message switch network, a peripheral switch controller connected to said first matrix for receiving supervisory signals from the peripheral ports and control signals from the main system control means via the message switching network, and for transmitting supervisory signals related to said status to the main system control means via the message switch network, and for controlling the first switching matrix, a second switching matrix for switching transmission paths between one or more peripheral unit ports and the circuit switching network under control of the peripheral switch controller upon receipt of control signals therefor.

7. A system as defined in claim 3, in which said message switching matrix is comprised of an array of circuits including means for receiving signals from plural input ports in serial time slots according to first sequences, means for providing output signals to plural output ports in serial time slots according to second sequences, means for receiving control signals at said control port in parallel format, and means for controlling the switching circuits to establish the second sequences upon receipt of a first predetermined form of control signals.

8. A system as defined in claim 4 in which said message switching matrix is comprised of an array of circuits including means for receiving signals from plural input ports in serial time slots according to first sequences, means for providing output signals to plural output ports in serial time slots according to second sequences, means for receiving control signals at said control port in parallel format, and means for controlling the switching circuits to establish the second sequences upon receipt of a first predetermined form of control signals, the circuit switching matrix being comprised of an array of circuits including means for receiving signals divided into serial time slots at a bidirectional port, means for switching said signals to a second bidirectional port in serial time slots according to a further sequence, means for receiving control signals in parallel format from said circuit switch network control processor, including means for controlling the circuit switching matrix to establish the further serial sequence upon receipt of a second form of control signals from the main system control means.

9. A system as defined in claim 8, including means for controlling the circuit switching network to output a third form of serial sequence signals to a bidirectional port upon receipt of a predetermined control signal.

10. A system as defined in claim 9 in which said third form of signals includes a component for causing a signalling signal to be applied to a peripheral unit bidirectional port.

11. A system as defined in claim 7, 8 or 9 in which each circuit of the array in said switching matrixes includes a connection memory for receiving and storing said control signals, and means for applying predetermined switching control signals to said matrix of switching circuits upon receipt by the connection memory of further predetermined control signals.

12. A system as defined in claim 8, 9 or 10 in which each circuit of the array in said switching matrixes includes a connection memory for receiving and storing said control signals, and means for applying predetermined control signals to said matrix of switching circuits upon receipt by the connection memory of further predetermined control signals, each of the array of circuit switching matrix circuits including a data memory for receiving and storing signals received from input ports, and further including means for switching sequences of signals alternately from the data memory or said predetermined control signals from said connection memory to output ports as defined by the further predetermined control signals.

13. A system as defined in claim 7, in which each said switching matrix includes means for receiving time division multiplexed input signals from a plurality of said input ports, data memory means for storing said input signals according to a predetermined plan, means for receiving control signals from an associated control processor and means for controlling the matrix to output predetermined portions of stored signals from the data memory to a parallel bus for transmission to the main system control means according to a plan defined by the control signals.

14. A system as defined in claim 7 or 13 further including means for receiving control signals of one form from the control processor, connection memory means for storing said first form of control signals, means for receiving and storing control signals of a second form from the control processor, and means for outputting time division multiplexed output signals to one or more of said output ports consisting of at least a predetermined portion of the control signals of the first form, as defined by at least a portion of the control signals of the second form.

15. A system as defined in claim 8, in which said peripheral unit control circuit means is comprised of a first switching matrix connected to the input and output ports of the message switch network, a peripheral switch controller connected to said first matrix for receiving supervisory signals from the peripheral ports and control signals from the main system control means via the message switching network, and for transmitting supervisory signals related to said status to the main system control means via the message switch network, and for controlling the first switching matrix, a second switching matrix for switching transmission paths between one or more peripheral unit ports and the circuit switching network under control of the peripheral switch controller upon receipt of control signals therefor.

16. A system as defined in claim 15, in which each said switching matrix includes means for receiving time division multiplexed input signals from a plurality of said input ports, data memory means for storing said input signals according to a predetermined plan, means for receiving control signals from an associated control processor and means for controlling the matrix to output predetermined portions of stored signals from the data memory to a parallel bus for transmission to the main system control means according to a plan defined by the control signals.

17. A system as defined in claim 16 further including means for receiving control signals of one form from the control processor, connection memory means for storing said first form of control signals, means for receiving and storing control signals of a second form from the control processor, and means for outputting time division multiplexed output signals to one or more of said output ports consisting of at least a predetermined portion of the control signals of the first form, as defined by at least a portion of the control signals of the second form.

18. A system as defined in claim 17 in which the peripheral switching matrix is of similar form as said circuit switching matrix.

19. A switching system comprising:
(a) a main system controller,
(b) a plurality of peripheral control units for connection to a plurality of peripheral units which are adapted to originate or receive digital signals,
(c) a circuit switching unit connected to the peripheral control units for establishing transmission paths for the digital signals between said peripheral units under control of the main controller,
(d) each peripheral control unit including controller means for monitoring the status of peripheral units and for controlling the connection of peripheral units to transmission paths leading to the circuit switching unit, and
(e) a message switching unit connected to the peripheral controller controller means for establishing transmission paths for call progress, instruction and/or confirmation message signals between the peripheral controller means and the main system controller whereby a call between peripheral units is facilitated.

20. A switching system comprising:
(a) a main system controller, including a digital processor connected to a parallel bus,
(b) a circuit switching network including circuit switching means for switching transmission paths for carrying digital signals exclusive of supervisory and control signals between network ports, and a circuit switching network controller, the circuit switching controller being connected to said bus for receiving control signals from the main system controller of a kind predetermined to enable it to cause the switching means to interconnect said paths between designated ones of said ports,
(c) a message switching network including message switching means having message ports for exclusively receiving and transmitting supervisory and control signals relating to said system, a message switch processor connected to said bus, said message switching means having a processor interface port connected to said message switch processor, said message switch processor being adapted to transmit signals to said main system controller, and through said message switching means to said message ports, and to receive signals via said message switch means from said message ports and transmit corresponding signals to the digital processor.

21. A switching system as defined in claim 20 further including a peripheral control network, including a peripheral switching matrix for connecting peripheral units to transmission paths connected to network ports of the circuit switching network, a controller for controlling the peripheral switching matrix, and means for transmitting and receiving control and supervisory signals related to the status of peripheral units between the peripheral switch controller and the message switching network message ports.

* * * * *